(12) United States Patent
Serieys et al.

(10) Patent No.: US 12,071,254 B2
(45) Date of Patent: Aug. 27, 2024

(54) THROTTLE CONTROL LEVERS

(71) Applicant: Ratier-Figeac SAS, Figeac (FR)

(72) Inventors: Julien Serieys, Lunan (FR); Didier Delbruel, Prévinquières (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/315,667

(22) Filed: May 11, 2023

(65) Prior Publication Data

US 2023/0365267 A1    Nov. 16, 2023

(30) Foreign Application Priority Data

May 11, 2022    (EP) ..................................... 22305698

(51) Int. Cl.
  *B64D 31/04*    (2006.01)
  *G05G 1/01*    (2008.04)
  *G05G 1/04*    (2006.01)
  *G05G 5/00*    (2006.01)

(52) U.S. Cl.
  CPC .............. *B64D 31/04* (2013.01); *G05G 1/01* (2013.01); *G05G 1/04* (2013.01); *G05G 5/005* (2013.01); *G05G 2505/00* (2013.01)

(58) Field of Classification Search
  CPC . B64D 31/04; G05G 1/01; G05G 1/04; G05G 5/005; G05G 2505/00
  USPC ..................... 74/519, 490.14, 529; 60/39.281
  See application file for complete search history.

(56) References Cited

U.S. PATENT DOCUMENTS

| | | | |
|---|---|---|---|
| 2,406,273 A * | 8/1946 | Waite ..................... | B64D 31/04 74/471 R |
| 5,984,241 A | 11/1999 | Sparks | |
| 9,457,891 B2 | 10/2016 | Sparks | |
| 2014/0061389 A1 | 3/2014 | Elabellaou et al. | |
| 2020/0148379 A1 | 5/2020 | Antraygue | |

FOREIGN PATENT DOCUMENTS

| | | |
|---|---|---|
| CN | 106438059 A | 2/2017 |
| CN | 112623234 A | 4/2021 |

OTHER PUBLICATIONS

Abstract for CN106438059 (A); Published: Feb. 22, 2017, 1 page.
Abstract for CN112623234 (A), Published: Apr. 9, 2021, 1 page.
European Search Report for Application No. 22305698.7, mailed Nov. 4, 2022, 5 pages.

* cited by examiner

*Primary Examiner* — Victor L MacArthur
(74) *Attorney, Agent, or Firm* — CANTOR COLBURN LLP

(57) ABSTRACT

A throttle control lever suitable for controlling the magnitude and direction of thrust of one or more aircraft engines is described. The throttle control lever comprises a frame, a trigger mechanism, a connection element, a cam engagement mechanism, a biasing means, a cam, and a grip suitable for gripping by a user when the throttle control lever is in use, The cam comprises a slot having first and second slot portions and a stop portion. The stop portion extends between and connects the first and second slot portions. The cam engagement mechanism comprises a cam lever and a slot engagement element, the cam lever is pivotally attached to the frame via a cam lever pivot, and the slot engagement element is attached to the cam lever. The trigger mechanism comprises a trigger lever and a trigger, the trigger lever is pivotally attached to the frame via a trigger pivot.

14 Claims, 7 Drawing Sheets

THROTTLE CONTROL LEVERS

CROSS-REFERENCE TO RELATED APPLICATIONS

This application claims priority to European Patent Application No. 22305698.7 filed May 11, 2022, the entire contents of which is incorporated herein by reference.

TECHNICAL FIELD

This disclosure relates to throttle control levers and in particular throttle control levers for use in an aircraft that prevent unintentional throttle control lever movement from engine idle or a forward thrust position into a reverse thrust position.

BACKGROUND

Throttle control levers suitable for controlling the magnitude and direction of thrust of one or more aircraft engines (hereafter collectively referred to as "engines") are typically pivoted to a support structure at a first end and provided with a handle or grip suitable to be gripped by a user (typically a pilot) at the other end. The lever is constrained in its movement, and can move between a first rotational position around the pivot attached to the support structure and a second rotational position around that pivot. The position of the lever between the first and second positions causes one or more sensors, or one or more mechanisms, to control whether the engines generate forward thrust, are idling (the engines are running but not generating any or any significant thrust), or generate reverse thrust. The magnitude of the thrust generated by the engines, if the engines are not idling, is determined by the position of the lever between the first and second positions. The first rotational position equates to maximum forward thrust and the second rotational position equates to maximum reverse thrust. The position that equates to the engines idling is between the first and second positions.

SUMMARY

According to a first aspect of the present disclosure there is provided a throttle control lever suitable for controlling the magnitude and direction of thrust of one or more aircraft engines. The throttle control lever comprises a frame, a trigger mechanism, a connection element, a cam engagement mechanism, a biasing means, a cam, and a grip suitable for gripping by a user when the throttle control lever is in use. The cam comprises a slot having a first and second slot portions and a stop portion, and the stop portion extends between and connects the first and second slot portions. The cam engagement mechanism comprises a cam lever and a slot engagement element, the cam lever is pivotally attached to the frame via a cam lever pivot, and the slot engagement element is attached to the cam lever. The trigger mechanism comprises a trigger lever and a trigger, and the trigger lever is pivotally attached to the frame via a trigger pivot. The trigger extends through the grip. The connection element is attached to the trigger lever and the cam lever and the biasing means biases the cam lever to rotate in a first direction around the cam lever pivot.

An advantage of the first aspect of the present disclosure is that the elements of the throttle control lever are relatively compact, which results in space and weight saving advantages. A further advantage is that the throttle control lever is mechanically relatively simple and as a result it is easily serviced if that is required, and it has a limited number of elements that may fail.

In an embodiment of the above embodiment, the trigger is so positioned on the grip that the trigger may be operated by one or both of the fourth and fifth finger of the hand of the user that is gripping the grip.

The configuration of the grip may be suitable for the left hand or for the right hand of the user.

An advantage of such an embodiment is that the location of the trigger has the result that the user's thumb, second and third fingers and palm are free to hold the grip. As a result, the user can exert a high level of control over the position of the throttle lever whilst simultaneously actuating the trigger.

In an embodiment of any of the above embodiments, the biasing means is configured to provide a biasing force that biases cam lever to rotate in the first direction, and the magnitude of the biasing force is such that one or two of a user's fingers can overcome the biasing force while the user is gripping the grip.

In an embodiment of any of the above embodiments, the frame comprises one or more components and has a longitudinal extent. The frame is rigid and integral with the cam lever pivot and trigger pivot, or includes attachment means for the cam lever pivot and the trigger pivot. The cam lever pivot and trigger pivot or attachment means for the cam lever pivot and trigger pivot are longitudinally separated on the frame.

In an embodiment of any of the above embodiments, the slot engagement element of the cam engagement mechanism is engaged with the cam slot and configured to be able to move along the cam slot but not to move significantly in a direction that is not the longitudinal direction of the first or second slots when the slot engagement element is not in the stop portion of the slot. When the slot engagement element is in the stop portion of the slot the slot engagement element may move between the ends of the first and second slot portions that communicate with the stop portion of the slot.

In an embodiment of any of the above embodiments, the first, second and stop portions of the cam are so arranged that the stop portion prevents the slot engagement mechanism from moving from the first slot portion to the second slot portion without pausing the movement towards the second slot portion. This can assist in engine management.

In an embodiment of any of the above embodiments, the frame is pivotally attached to a support structure via a frame pivot, and the cam is maintained or held in a fixed position relative to the frame pivot. In some embodiments the cam is fixed to the support structure.

In an embodiment of any of the above embodiments, each of the first and second slot portions extend in an arcuate direction, where the centre of each arc is the frame pivot. In an embodiment of any of the above embodiments, the radius of the arc of one of the first and second slot portions is larger than the radius of the other of the first and second slot portions, and the stop portion extends in a substantially radial direction between an end of the first slot portion and an end of the second slot portion.

The support structure may be any structure that has a fixed position within the aircraft and the mechanical strength to resist the forces that use of the throttle control lever will expose the support structure to.

In an embodiment of any of the above embodiments, the biasing means is configured to bias the cam lever and thus the slot engagement element towards the end of the stop portion of the slot adjacent the end of the first slot portion when the slot engagement element is in the stop portion of the cam slot. This arrangement of the cam slot, cam lever and biasing means has an advantage in that the user of the throttle control lever, typically a pilot, has to take a positive action to both overcome the bias acting on the cam lever, and to cause the throttle control lever to rotate about the lever pivot so as to cause the engines to start to generate reverse thrust. This decreases the likelihood of unintentional commencement of generation of reverse thrust by the engines and thus decreases the likelihood of engine damage resultant from the generation of reverse thrust when it is detrimental for the engines to do so.

In an embodiment of any of the above embodiments, the first slot portion is associated with forward thrust, the second slot portion is associated with reverse thrust, and the stop portion is associated with idle when the throttle control lever is a component in an aircraft engine control system.

In an embodiment of any of the above embodiments, the slot engagement means is integral with the cam lever. In an alternative embodiment of any of the above embodiments, the cam lever is so configured that a slot engagement element can be attached to the cam lever.

In an embodiment of any of the above embodiments, the cam lever, connector, and trigger lever are so configured that actuation of the trigger by a user may cause the cam lever to rotate in the direction opposite to the first direction around the cam lever pivot when the slot engagement element is in the stop portion of the slot.

In an embodiment of any of the above embodiments, the trigger is attached to an end of the trigger lever.

In an embodiment of any of the above embodiments, the trigger lever has a first and a second end, the trigger is attached to the first end of the trigger lever, the trigger pivot engages with the second end of the trigger lever, and the connector element engages with the trigger lever between the first and second ends.

In an embodiment of any of the above embodiments, the trigger lever has a first and a second end, the trigger is attached to the first end of the trigger lever, the trigger pivot engages with the trigger lever between the first and second ends of the trigger lever, and the connector element engages with the trigger lever between the trigger pivot and the second end of the trigger lever or at the second end of the trigger lever.

In an embodiment of any of the above embodiments, the trigger lever extends in a substantially straight direction between the first and second ends.

In an embodiment of any of the above embodiments, the trigger lever includes at least one angle or curve along the length of the trigger lever and as such at least one portion of the trigger lever extends in one direction and at least one portion of the trigger lever extends in another direction.

In an embodiment of any of the above embodiments, the actuation of the trigger by a user is achieved by pushing the trigger.

In an embodiment of any of the above embodiments, the actuation of the trigger by a user is achieved by pulling the trigger.

In an embodiment of any of the above embodiments, the connector element is rigid. For example, but without limitation, the connector element may be a rod or a bar of a suitable material. The suitable material may be a metal, a metal alloy, or a composite material that is not damaged by repeated tensile or compressive loadings.

In an embodiment of any of the above embodiments, the connector element is flexible or not rigid. For example, but without limitation, the connector element may be a wire, cable, or chain of a suitable material. The material may be a metal, a metal alloy, a composite material, or plastics material that is not damaged by repeated tensile loadings.

In an embodiment of any of the above embodiments, the cam lever, connector, and trigger lever are so configured that actuation of the trigger by a user causes the connector element to pull the cam lever. That is the connector is placed in tension as a result of movement of the trigger lever, and as a result the connector pulls the cam lever and causes the cam lever to rotate about the cam lever pivot if the slot engagement element is in the stop portion of the slot and free to move with the cam lever. The slot engagement element would not be free to move with the cam lever if the slot engagement element has already moved along the stop portion of the slot and is adjacent the end of the second slot portion.

In an embodiment of any of the above embodiments when the connector is rigid, the cam lever, connector, and trigger lever are so configured that actuation of the trigger by a user causes the connector element to push the cam lever. That is the connector is placed in compression as a result of movement of the trigger lever, and as a result the connector pushes the cam lever and causes the cam lever to rotate about the cam lever pivot if the slot engagement element is in the stop portion of the slot and free to move with the cam lever.

In an embodiment of any of the above embodiments, the cam engagement element comprises an axle and a roller adapted to rotate around the axle. This reduces friction when the throttle control lever is used by a user and/or when the actuation of the trigger causes the cam lever to rotate about the cam lever pivot if the slot engagement element is in the stop portion of the slot and free to move with the cam lever. The axle may be integral with or attached to the cam lever.

In an embodiment of any of the above embodiments, the throttle control lever further comprises a control mechanism, in which the control mechanism and the trigger are so positioned on the grip that the control mechanism and the trigger are operable by different fingers of a hand gripping the grip. The control mechanism my be adapted to control an aspect of the functioning of the engines that is not the thrust being produced by the engines, or may control a different aspect of the functioning of the aircraft. In some embodiments the control mechanism is actuated by the user's thumb.

According to a second aspect of the present disclosure there is provided an aircraft engine control system comprising at least one throttle control lever according to the first aspect of the present disclosure.

BRIEF DESCRIPTION OF THE FIGURES

The present invention will be further described and explained by way of example with reference to the accompanying drawings in which.

DETAILED DESCRIPTION

Figure 1:
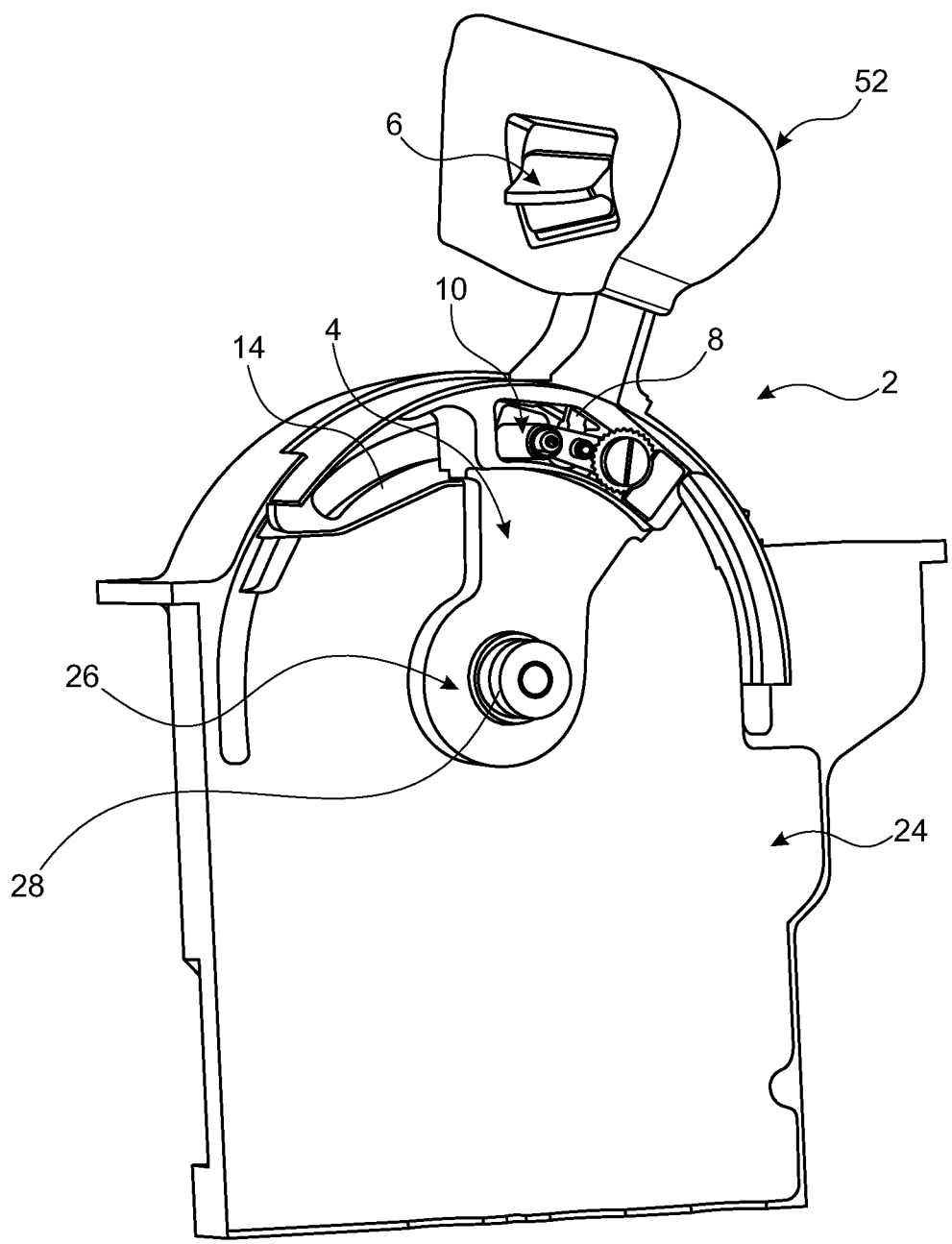
FIG. 1 shows a schematic view of an embodiment of a throttle control lever according to the present disclosure.
Figure 2:
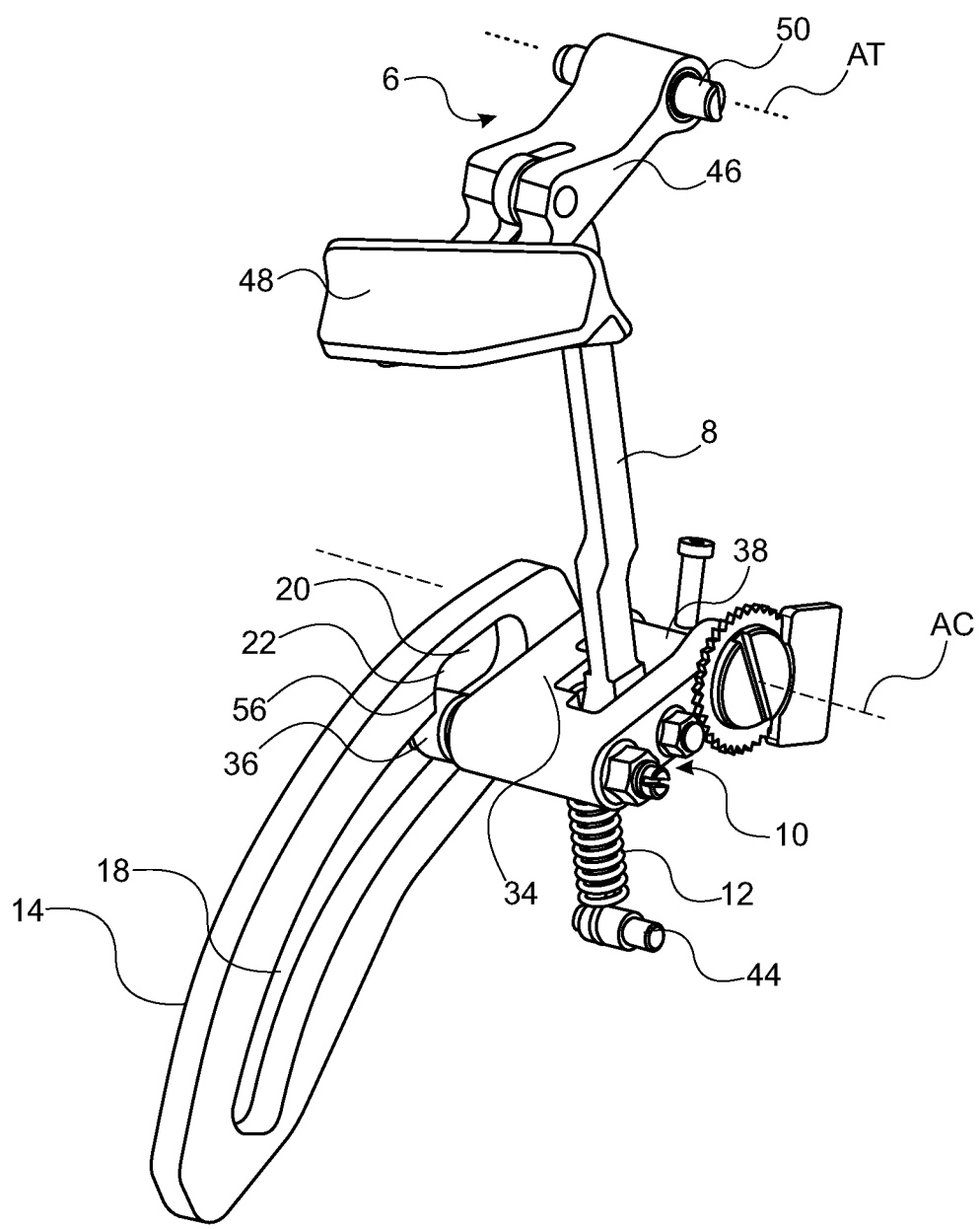
FIG. 2 shows a first schematic view of part of the throttle control lever of FIG. 1.
Figure 3:
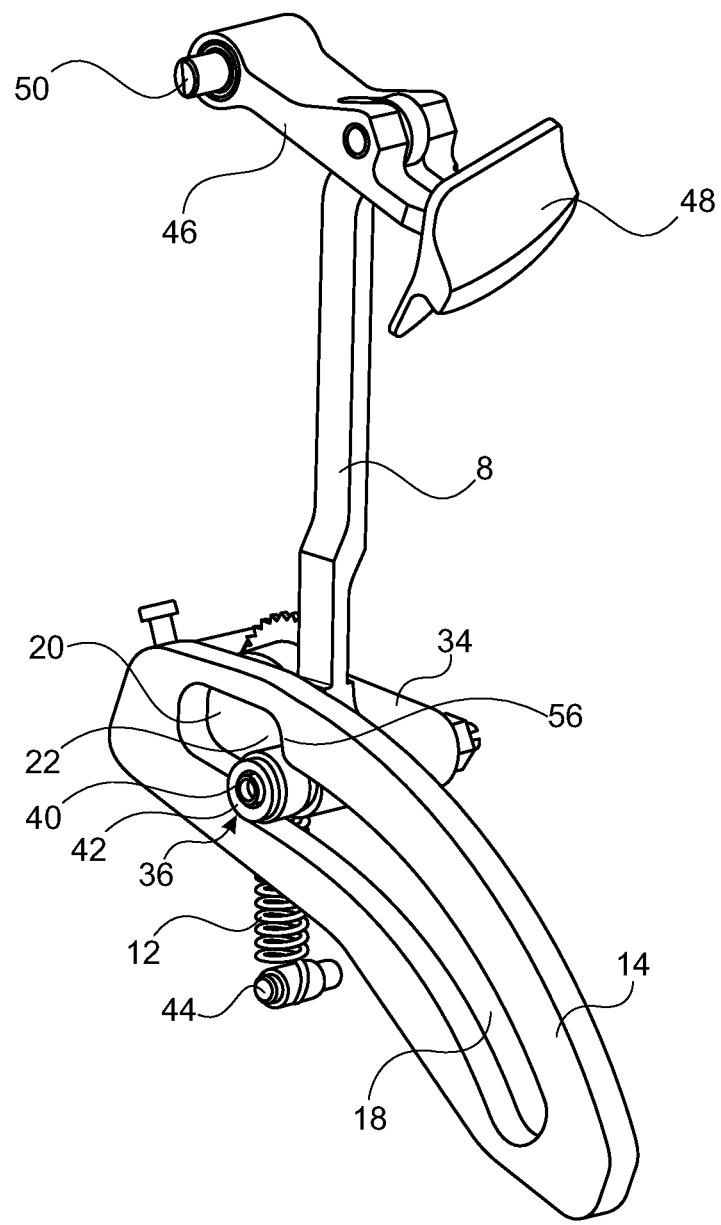
FIG. 3 shows the first schematic view of FIG. 2 from a second perspective.
Figure 4:
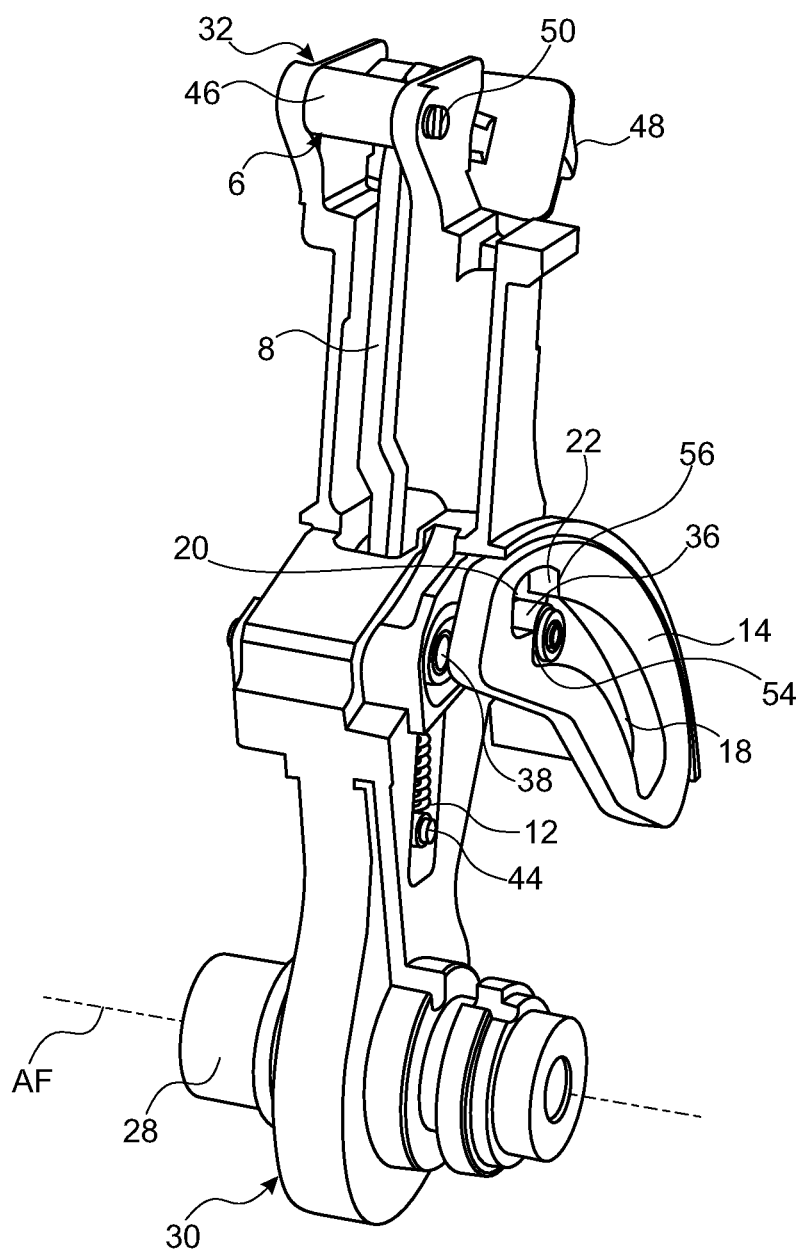
FIG. 4 shows a second schematic view of part of the throttle control lever of FIG. 1.
Figure 5:
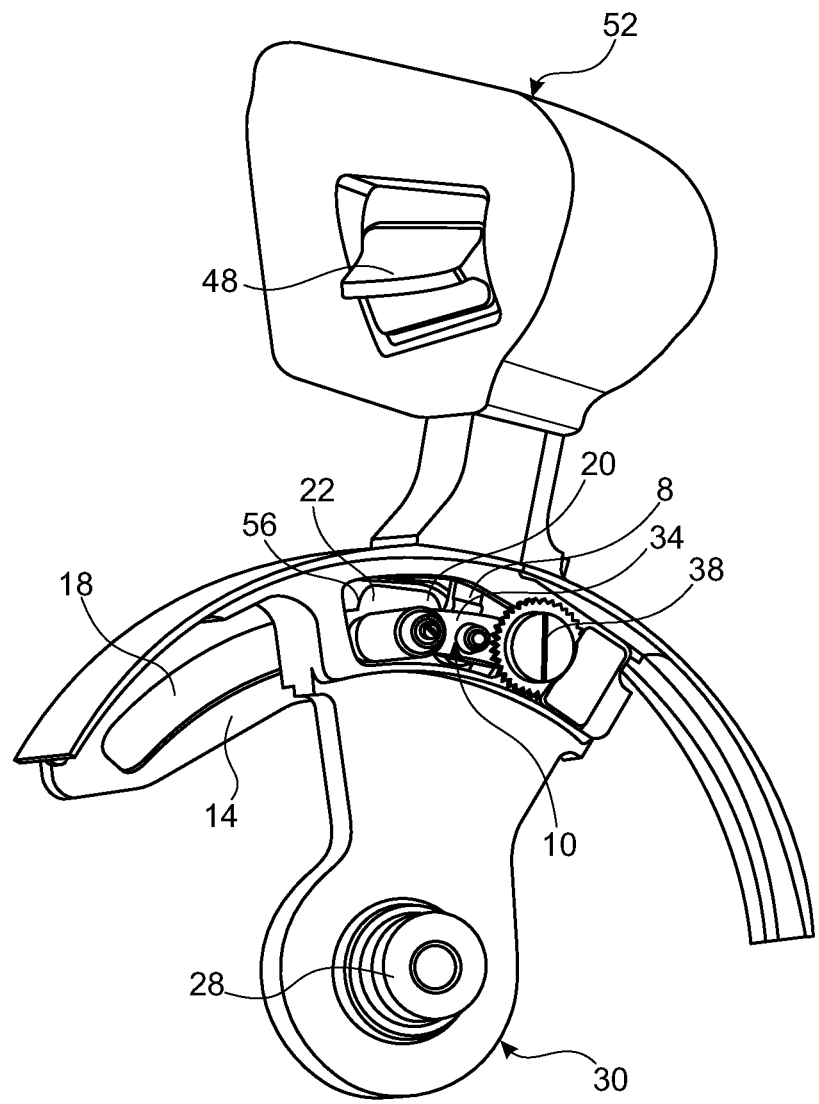
FIG. 5 shows a third schematic view of part of the throttle control lever of FIG. 1.
Figure 6:
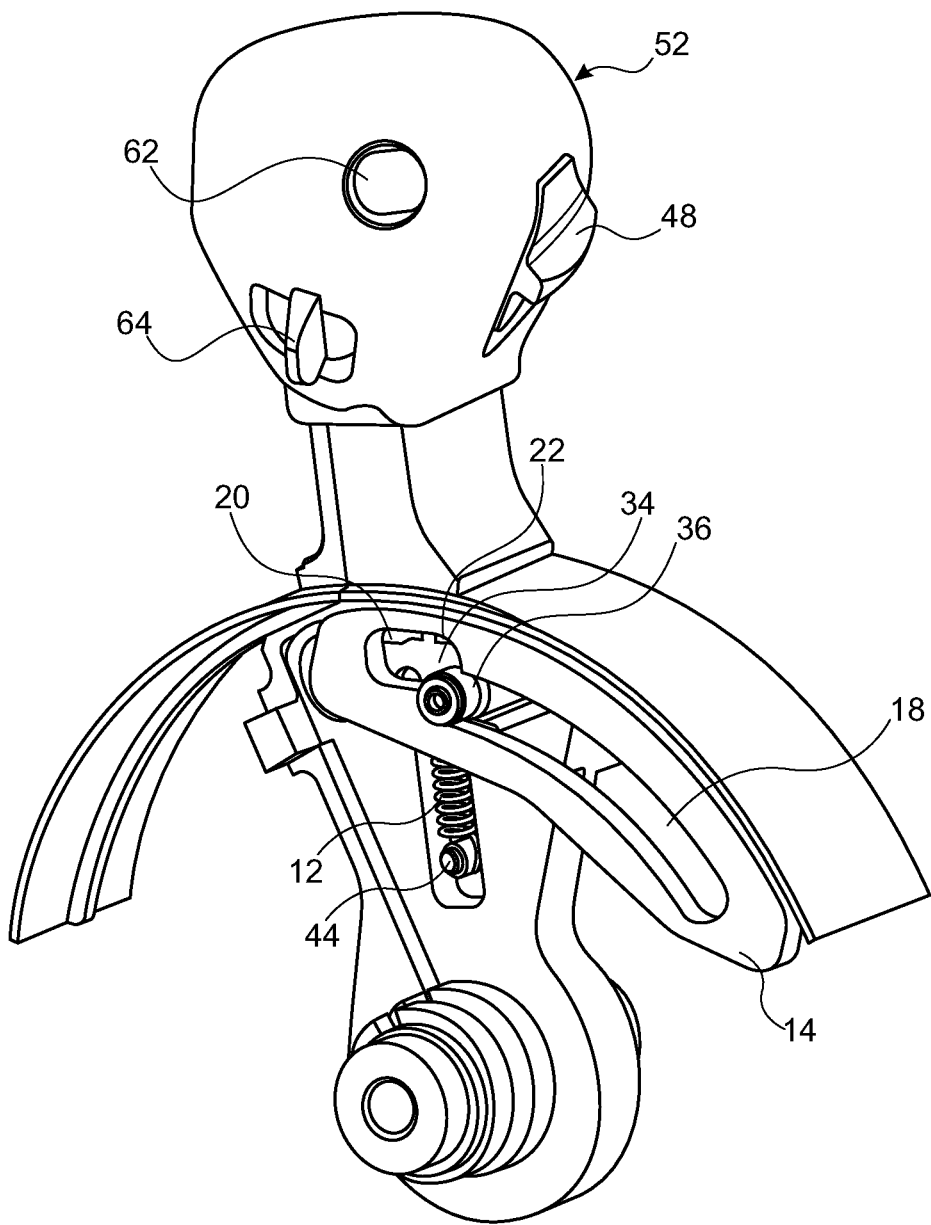
FIG. 6 shows the third schematic view of FIG. 5 from a second perspective.
Figure 7:
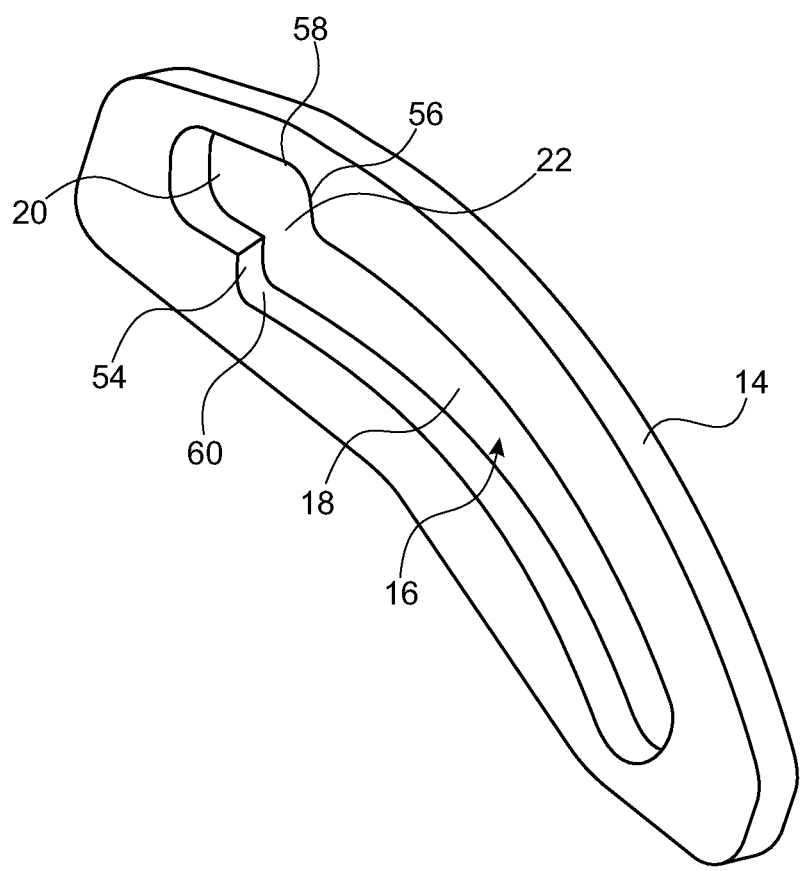
FIG. 7 shows a fourth schematic view of part of the throttle control lever of FIG. 1.

With reference to FIGS. 1 to 7, a throttle control lever 2 includes a frame 4, a trigger mechanism 6, a connection element 8, a cam engagement mechanism 10, a biasing means 12 and a cam 14. The throttle control lever 2 is for controlling the magnitude and direction of thrust of one or more aircraft engines.

The frame 4 is pivotally attached to a support structure 24 via a frame pivot 26. The frame pivot 26 comprises a frame axle 28 that is part of the frame 4 and an aperture (not shown) in the support structure 24. The frame axle 28 has a central axis AF. The aperture and frame axle 28 are so configured and dimensioned that the frame axle 28 is in sliding contact with the face of the support structure 24 that defines the aperture, and the frame axle 28 can rotate around the central axis AF when within the aperture.

The frame 4 is longitudinally extending from a first end 30 which includes the frame axle 28 to a second end 32.

The cam 14 is fixed to the support structure 24 by one or more fixing means (not shown) and thus maintained or held in a fixed position relative to the frame pivot 26.

The cam 14 comprises a slot 16 which includes first and second slot portions 18, 20 and a stop portion 22. The stop portion 22 extends between and connects the first and second slot portions 18, 20 and includes a first stop wall 54 which faces the end of the first slot portion 18 that is adjacent the stop portion 22, a second stop wall 56 which faces the end of the second slot portion 20 that is adjacent the stop portion 22, a third stop wall 58 that is at the end of the stop portion 22 that is adjacent the end of the second slot portion 20, and a fourth stop wall 60 that is at the end of the stop portion 22 that is adjacent the end of the first slot portion 18. Both of the first and second slot portions 18, 20 extend in an arcuate direction, where the centre of each arc is the frame pivot 26/axis AF. The radius of the arc of the second slot portion 20 is larger than the radius of the first slot portion 18. The stop portion 22 extends in a substantially radial direction (relative to axis AF) between the fourth stop wall 60/the end of the first slot portion 18 adjacent the stop portion 22 and the fourth stop wall 60/the end of the second slot portion 20 adjacent the stop portion 22.

The cam engagement mechanism 10 comprises a cam lever 34 and a slot engagement element 36. The cam lever 34 is pivotally attached to the frame 4 via a cam lever pivot 38 which has a central axis AC. The cam lever 34 may pivot around the cam lever pivot 34/central axis AC when free to do so. The slot engagement element 36 is a roller 42 and an axle 40 that is attached to and extends from the cam lever 34. The cam lever 34 and slot engagement element 36 are so configured that the slot engagement element 36 extends into the slot 16. The roller 42 is so dimensioned that the roller may move along the slot 16, and, when the slot engagement element 36 is within the first or second slot portions 18, 20, the slot engagement element 36 may make only a minimal amount of movement in a radial direction (relative to axis AF) or circumferential movement (relative to axis AC). When the slot engagement element 36 is within the stop portion 22 of the slot (as shown in FIGS. 2 to 6), the slot engagement element 36 may move in a radial direction (relative to axis AF) or circumferential direction (relative to axis AC) between the third and fourth stop walls 58, 60/the ends of the first and second slot portions 18, 20.

The biasing means 12 extends between an anchor 44 on the frame 4 and the cam lever 34. The biasing means 12 is a helical tension spring in the current embodiment. Other types of biasing means 12 may be employed in other embodiments of the present disclosure. The biasing means biases the slot engagement element 36 to the fourth stop wall 60/adjacent the end of the first slot portion 18 when the slot engagement element 36 is in the stop portion 22 of the slot 16.

The trigger mechanism 6 comprises a trigger lever 46 and a trigger 48, the trigger lever 46 is pivotally attached to the frame 4 via a trigger pivot 50 at or adjacent to the second end 32 of the frame 4. The trigger pivot 50 has a central axis AT and the trigger lever 46 may rotate around the trigger pivot 50/central axis AT.

The connection element 8 is attached to and extends between the trigger lever 46 and the cam lever 34. The illustrated connection element 8 is a rigid element and capable of withstanding the tension introduced into the connection element 8 when the trigger 48 is actuated by a user. In unillustrated alternative embodiments, the connection element 8 may be a flexible or semi flexible cable, wire or other longitudinally extending filament.

The throttle lever 2 further comprises a grip 52 which surrounds at least the second end 32 of the frame 4, the trigger lever 46 and trigger pivot 50 of the trigger mechanism 6. The trigger 48 extends at least partially out of the grip 52 via an aperture (not shown) in the grip 52. The grip 52 is so configured that it fits the hand of a user of the throttle lever 2. The trigger 48 is so located relative to the grip that when the throttle lever 2 is fitted into an aircraft, and the user is sitting where the user is intended to sit relative to the throttle lever 2, the fourth and/or fifth fingers user's hand which is closest to the throttle lever 2 may engage with and are able to manipulate the trigger 48 when the user is holding the grip 52 with their thumb, the rest of their fingers, and their palm. The biasing means 12 is so configured that the biasing force it exerts on the cam lever 34 may be overcome by whichever of the fourth and or fifth fingers of the user that the trigger 48 is adapted to be manipulated by.

The throttle lever 2 further comprises a first control mechanism 62, and a second control mechanism 64. The first and second control mechanisms 62, 64 are connected to used to control aspects of the functioning of the aircraft that are associated with operation of the engines or other functions of the aircraft. The first and second control mechanisms 62, 64 are so located relative to the grip that when the throttle lever 2 is fitted into an aircraft, and the user is sitting where the user is intended to sit relative to the throttle lever 2, the user's thumb or first finger may engage with and is able to manipulate the first and second control mechanisms 62, 64 when the user is holding the grip 52.

When the throttle control lever 2 shown in FIGS. 1 to 7 is fitted to an aircraft, the cam 14 is orientated so that the slot 16 extends in a substantially aircraft nose to tail direction. The first slot portion 18 of the slot 16 is forward of the second slot portion 20 and the presence of the slot engagement element 36 in the first slot portion 18 is associated with the engines of the aircraft generating forward thrust. The presence of the slot engagement element 36 in the second slot portion 20 is associated with the engines generating reverse thrust, and the presence of the slot engagement element 36 in the stop portion 22 of the slot 16 is associated with the engines idling.

When the slot engagement element 36 is in the stop portion 22 of the slot 16, the biasing means, as described above, biases the slot engagement element 36 radially inwards (relative to the axis AF) and towards the fourth stop wall 60 of the slot/the end of stop portion 22 adjacent the end of the first slot portion 18. As such, when the or each engine is idling a user of the throttle control lever 2 gripping the grip 52 may push the throttle control lever 2 forwards and the slot engagement element 36 along the first slot portion 18 away from the stop portion 22. This causes suitable sensors or mechanisms to cause the engines to develop forward thrust with the magnitude of the forward thrust being determined by the position of the slot engagement element 36 along the first slot portion 18.

When reverse thrust is desired, if the slot engagement element 36 is not already in the stop portion 22 of the slot 16, the throttle control lever 2 is pulled back by the user until the slot engagement element 36 is in the stop portion 22 of the slot 16. The slot engagement element 36 then abuts the first stop wall 54 and further movement of the slot engagement element 36 towards the second slot portion 20 is prevented. The user then actuates the trigger 48 by pulling the trigger upwards/away from the frame pivot 26 with their fourth and/or fifth finger. The actuation of the trigger 48 causes the trigger lever 46 to rotate around the trigger pivot 50/axis AT and the connection element 8 to be pulled away from the frame pivot 26. The movement of the connection element 8 causes movement of the cam lever 34 around the cam lever pivot 38 and the slot engagement element 36 to move away from the frame pivot 26/axis AF in a substantially radial direction along the stop portion 22, and against the bias imparted by the biasing means 12 until the slot engagement element 36 abuts the third stop wall 58. The throttle control lever 2 can then be pulled backwards by the user and the slot engagement element 36 enters the second slot portion 20. This causes suitable sensors or mechanisms to cause the engines to develop reverse thrust with the magnitude of the reverse thrust being determined by the position of the slot engagement element 36 along the second slot portion 20.

When reverse thrust is no longer required, the user pushes the throttle control lever 2 forward until the slot engagement element 36 abuts the second stop wall 56. The biasing means 12 will then bias the slot engagement element 36 substantially radially inward (relative to axis AF) until the slot engagement element 36 abuts the fourth stop wall 60 and is adjacent the end of the first slot portion 18.

The above description is meant to be exemplary only, and one skilled in the art will recognize that changes may be made to the embodiment described without departing from the scope of the invention disclosed. Still other modifications which fall within the scope of the present invention will be apparent to those skilled in the art, in light of a review of this disclosure.

Various aspects of the throttle control lever disclosed may be used alone, in combination, or in a variety of arrangements not specifically discussed in the embodiments described above. This disclosure is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A throttle control lever suitable for controlling the magnitude and direction of thrust of one or more aircraft engines, the throttle control lever comprising:
   a frame;
   a trigger mechanism, wherein the trigger mechanism comprises a trigger lever and a trigger, wherein the trigger lever is pivotally attached to the frame via a trigger pivot;
   a connection element;
   a cam engagement mechanism, wherein the cam engagement mechanism comprises a cam lever and a slot engagement element, the cam lever is pivotally attached to the frame via a cam lever pivot, and the slot engagement element is attached to the cam lever;
   a biasing means, wherein the biasing means biases the cam lever to rotate in a first direction around the cam lever pivot;
   a cam, wherein the cam comprises a slot having first and second slot portions and a stop portion, in which the stop portion extends between and connects the first and second slot portions; and
   a grip suitable for gripping by a user when the throttle control lever is in use, wherein the trigger extends through the grip;
   wherein the connection element is attached to the trigger lever and the cam lever.

2. A throttle control lever according to claim 1 in which the trigger is so positioned on the grip that the trigger may be operated by one or both of the fourth and fifth finger of a hand of a user when gripping the grip.

3. A throttle control lever according to claim 1, in which the biasing means is configured to provide a biasing force that biases cam lever to rotate in the first direction, and the magnitude of the biasing force is such that one or two of a user's fingers can overcome the biasing force while the user is gripping the grip.

4. A throttle control lever according to claim 1, in which:
   the frame is pivotally attached to a support structure via a frame pivot,
   the cam is maintained in a fixed position relative to the frame pivot,
   each of the first and second slot portions extend in an arcuate direction, where the center of each arc is the frame pivot, the radius of the arc of one of the first and second slot portions is larger than the radius of the other of the first and second slot portions, and the stop portion extends in a substantially radial direction between an end of the first slot portion and an end of the second slot portion.

5. A throttle control lever according to claim 4, in which the biasing means is configured to bias the slot engagement element toward the end of the stop portion of the slot adjacent the end of the first slot portion when the slot engagement element is in the stop portion of the cam slot.

6. A throttle control lever according to claim 1, in which the first slot portion is associated with forward thrust, the second slot portion is associated with reverse thrust, and the stop portion is associated with idle when the throttle control lever is a component in an aircraft engine control system.

7. A throttle control lever according to claim 1, in which the cam lever, connection element, and trigger lever are so configured that actuation of the trigger by a user causes the cam lever to rotate in the direction opposite to the first direction around the cam lever pivot.

8. A throttle control lever according to claim 1, in which the connection element is rigid.

9. A throttle control lever according to claim 1, in which the connection element is flexible.

10. A throttle control lever according to claim 1, in which the cam lever, connection element, and trigger lever are so configured that actuation of the trigger by a user causes the connection element to pull the cam lever.

11. A throttle control lever according to claim 1, in which the cam lever, connection element, and trigger lever are so configured that actuation of the trigger by a user causes the connection element to push the cam lever.

12. A throttle control lever according to claim 1, in which the cam engagement element comprises an axle and a roller adapted to rotate around the axle.

13. A throttle control lever according to claim 12, further comprising:
   a control mechanism, in which the control mechanism and the trigger are so positioned on the handle portion that the control mechanism and the trigger are operable by different fingers of a hand when gripping the handle portion.

14. An aircraft engine control system comprising:
a throttle control lever according to claim 1.

\* \* \* \* \*